United States Patent
Uhle et al.

(10) Patent No.: US 11,929,089 B2
(45) Date of Patent: Mar. 12, 2024

(54) APPARATUS AND METHOD FOR PROCESSING A MULTICHANNEL AUDIO SIGNAL

(71) Applicant: Fraunhofer-Gesellschaft zur Förderung der angewandten Forschung e.V., Munich (DE)

(72) Inventors: Christian Uhle, Ursensollen (DE); Michael Kratz, Erlangen (DE); Paul Klose, Fürth (DE); Timothy Leonard, Nuremberg (DE); André Luvizotto, Nuremberg (DE); Sebastian Scharrer, Altdorf (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 67 days.

(21) Appl. No.: 16/176,280

(22) Filed: Oct. 31, 2018

(65) Prior Publication Data

US 2019/0066712 A1 Feb. 28, 2019

Related U.S. Application Data (63) Continuation of application No. PCT/EP2017/061895, filed on May 17, 2017.

(30) Foreign Application Priority Data

May 20, 2016 (EP) .................................. 16170723
Jul. 14, 2016 (EP) .................................. 16179531

(51) Int. Cl.
*G10L 21/043* (2013.01)
*G10L 19/008* (2013.01)
(Continued)

(52) U.S. Cl.
CPC .......... *G10L 21/043* (2013.01); *G10L 19/008* (2013.01); *G10L 19/02* (2013.01);
(Continued)

(58) Field of Classification Search
CPC ....... G10L 19/008; G10L 19/04; G10L 21/04; G10L 19/167; H04S 3/008; H04S 2400/01; H04S 2400/03
(Continued)

(56) References Cited

U.S. PATENT DOCUMENTS

| 2004/0078205 A1* | 4/2004 | Liljeryd | ................. H04B 1/667 704/503 |
| 2005/0010397 A1* | 1/2005 | Sakurai | ................... G10L 21/04 704/E21.017 |

(Continued)

FOREIGN PATENT DOCUMENTS

| EP | 1918911 A1 | 5/2008 |
| EP | 1810279 B1 | 12/2013 |

(Continued)

OTHER PUBLICATIONS

Shi Dong, et al., "Expanded three-channel mid/side coding for threedimensional multichannel audio systems" // EURASIP Journal on Audio, Speech, and Music Processing 2014, pp. 1-13.

(Continued)

*Primary Examiner* — Richemond Dorvil
*Assistant Examiner* — Rodrigo A Chavez
(74) *Attorney, Agent, or Firm* — McClure, Qualey & Rodack, LLP (57) ABSTRACT

An apparatus for processing a multichannel audio signal has a plurality of channel signals. The apparatus performs a time scale modulation of the multichannel audio signal and has a phase adaptor and a separator. The phase adaptor provides a processed signal by modifying a phase of a signal based on
(Continued)

a combination of the channel signals. The separator provides separated signals based on the processed signal. A corresponding method is provided.

30 Claims, 5 Drawing Sheets (51) Int. Cl.
*G10L 19/02* (2013.01)
*G10L 21/04* (2013.01)
*G11B 27/00* (2006.01)
*G11B 27/28* (2006.01)

(52) U.S. Cl.
CPC ............ *G10L 21/04* (2013.01); *G11B 27/005* (2013.01); *G11B 27/28* (2013.01)

(58) Field of Classification Search
USPC .................. 704/500, E19.005, 503, E21.017
See application file for complete search history.

(56) References Cited

U.S. PATENT DOCUMENTS

| | | | |
|---|---|---|---|
| 2005/0137729 A1* | 6/2005 | Sakurai | G10L 21/04 381/1 |
| 2006/0009225 A1 | 1/2006 | Herre et al. | |
| 2007/0094031 A1* | 4/2007 | Chen | G10L 21/04 704/E21.017 |
| 2007/0135952 A1 | 6/2007 | Chubarev | |
| 2008/0114606 A1* | 5/2008 | Ojala | H04M 7/006 704/E21.017 |
| 2009/0137729 A1 | 5/2009 | Uosaki et al. | |
| 2010/0296672 A1* | 11/2010 | Vickers | H04H 60/04 381/119 |
| 2011/0004479 A1* | 1/2011 | Ekstrand | G10L 19/0212 704/500 |
| 2012/0051549 A1* | 3/2012 | Nagel | G10L 21/04 381/56 |
| 2012/0232912 A1* | 9/2012 | Tammi | G10L 19/022 704/502 |
| 2013/0182862 A1* | 7/2013 | Disch | G10H 1/08 381/61 |
| 2013/0262130 A1* | 10/2013 | Ragot | G10L 19/008 704/500 |
| 2015/0380001 A1 | 12/2015 | Purnhagen et al. | |
| 2016/0104490 A1 | 4/2016 | Sukowski et al. | |
| 2016/0196831 A1* | 7/2016 | Groeschel | H03H 17/0455 381/97 |

FOREIGN PATENT DOCUMENTS

| | | |
|---|---|---|
| EP | 2 981 960 A1 | 2/2016 |
| JP | 2000049614 A | 2/2000 |
| KR | 10-2008-0091099 A | 10/2008 |
| KR | 10-2016-0024918 A | 3/2016 |
| WO | 2008/046967 A1 | 4/2008 |
| WO | 2012150482 A1 | 11/2012 |
| WO | 2012/167479 A1 | 12/2012 |
| WO | 2014/161993 A1 | 10/2014 |

OTHER PUBLICATIONS

Russian Office Action dated Aug. 12, 2019, "The Federal Institute for Industrial Property of The Federal Service for Intellectual Property, Patents and Trade Marks," Application No. 2018145037/28, pp. 1-10.
Japanese office Action dated Jan. 8, 2020, issued in application No. 2018-560586.
English language translation of Japanese Office Action dated Jan. 8, 2020, issued in application No. 2018-560586.
International Search Report and Written Opinion issued in application No. PCT/EP2017/061895 dated Sep. 22, 2017.
International Preliminary Examination Report issued in issued in application No. PCT/EP2017/061895 dated Aug. 28, 2018.
M. Dolson: "The Phase Vocoder: A Tutorial", Computer Music Journal, vol. 10, No. 4, pp. 14-27, Dec. 21, 1986, XP009029676.
J. Laroche et al.: "Improved Phase Vocoder Time-Scale Modification of Audio", IEEE Transaction on Speech and Audio Processing, vol. 7, No. 3, pp. 323-332, May 1, 1999, XP011054370.
T. Karrer, E. Lee, and J. Borchers, "PhaVoRIT: A Phase Vocoder for Real-Time Interactive Time Stretching", International Computer Music Conference (ICMC), Nov. 6, 2006; pp. 1-8, XP002424910.
J. L. Flanagan et al.: "Phase vocoder", Bell System Technical Journal, AT and T, vol. 45, No. 9, Nov. 1, 1966, pp. 1493-1509, XP011629282.
J. Laroche et al.: "Phase-vocoder: about this phasiness business", Applications of Signal Processing to Audio and Acoustics, Oct. 19, 1997, p. 4pp, XP010248209.
M. Puckette: "Phase-locked vocoder"; Applications of Signal Processing to Audio and Acoustics, Oct. 15, 1995, pp. 222-225, XP010154670.
M. Portnoff: "Time-scale modification of speech based on short-time Fourier analysis", IEEE Transactions on Acoustics, Speech and Signal Processing, vol. 29, No. 3, Jun. 1, 1981, pp. 374-390, XP055405797.
M. R. Portnoff: "Time-Frequency Representation of Digital Signals and Systems Based on Short-Time Fourier Analysis", IEEE Transactions on Acoustics, Speech and Signal Processing, vol. ASSP-28, No. 1, Feb. 1, 1980, pp. 55-69, XP000984575.
Decision to Grant dated Aug. 19, 2021, issued in application No. KR 10-2018-7033574.
English translation of Decision to Grant dated Aug. 19, 2021, issued in application No. KR 10-2018-7033574.
Laroche, J., et al.: "Improved Phase Vocoder Time-Scale Modification of Audio", IEEE Transaction on Speech and Audio Processing; vol. 7; No. 3; May 1999; pp. 323-332.
Portuguese language office action dated Jun. 12, 2023, issued in application No. BR 1120180738948.
Office Action dated Dec. 21, 2023, issued in application No. IN 201827041588 (with English language translation).

* cited by examiner

APPARATUS AND METHOD FOR PROCESSING A MULTICHANNEL AUDIO SIGNAL

CROSS-REFERENCES TO RELATED APPLICATIONS

This application is a continuation of copending International Application No. PCT/EP20171061895, filed May 17, 2017, which is incorporated herein by reference in its entirety, and additionally claims priority from European Applications Nos. EP 16170723.7, filed May 20, 2016, and EP 16179531.5, filed Jul. 14, 2016, both of which are incorporated herein by reference in their entirety.

The invention refers to an apparatus for processing a multichannel audio signal. The multichannel audio signal comprises a plurality of i.e. at least two channel signals. The apparatus performs a time scale modulation of the multichannel audio signal. The invention also refers to a corresponding method and a computer program.

BACKGROUND OF THE INVENTION

Time scale modification (TSM) refers to the processing to slow down or speed up the playback of an audio signal without affecting its pitch. TSM in combination with sample rate conversion also enables to change the pitch without modifying the tempo. The challenge for TSM is to maintain all other characteristics of the audio signal (except either tempo or pitch) and in particular the sound quality. The processing should not produce audible artefacts.

For single-channel input signals, the main important characteristic is the timbre. For signals having more than one channel, also spatial characteristics need to be maintained. The spatial characteristics comprise the position and width of the direct sound source and the diffuseness of ambient sound. They can be quantified by inter-channel level differences (ICLD), inter-channel time differences (ICTD), inter-channel phase differences (ICPD) or and inter-channel coherence (ICC).

Two fundamentally different approaches to time scale modification exist. One is applied in the time domain and the other is applied in the frequency domain. Processing in the time domain uses a synchronized overlap-add (SOLA) scheme. The signal is cut into overlapping frames and these frames are shifted and combined to stretch or shrink the signal. The shifting position is typically computed by maximizing a measure of similarity, e.g. correlation between the signal frame and its shifted copy.

This method in the time domain is of low computational complexity. It yields good results for monophonic (in contrast to polyphonic) signals, e.g. speech or flute tones, because the shifting offset can be determined as an integer multiple of the period of the fundamental frequency in order to avoid discontinuities and destructive interference in the output signal. In other words, the shifted signal frames are added in a phase coherent way. For polyphonic inputs with multiple tones having different fundamental frequencies, the shifting cannot be determined such that wave form similarity is fulfilled for all tones (pitches).

For many musical signals, better results in terms of sound quality are obtained by applying the processing in the frequency domain. This method uses e.g. the phase vocoder scheme [1] as shown in the block diagram shown in FIG. 1 and briefly explained in the following.

Figure 1:
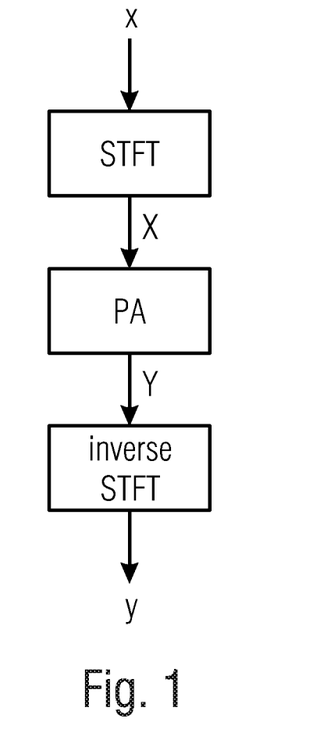
FIG. 1 shows a block diagram of a time scale modification method in the frequency domain according to the state of art.

The input audio signal x(n) is transformed into the frequency domain using a short-time Fourier transform (STET). Equivalently, another type of filterbank or transform can be used for which the inverse processing can be applied with sufficiently small reconstruction error.

In the mentioned embodiment, the input signal x(n) is cut into overlapping frames and a Discrete Fourier transform (DFT) is computed for each frame according to the following Equation (1), yielding a short-time Fourier transform (STET) representation of the signal, also referred to as STFT coefficients (or spectral coefficients), according to $$X(m, k) = \sum_{n=0}^{N-1} x(mR_0 + n)w_a(n)e^{-j\Omega_k n} \qquad (1)$$

A time frame index is denoted by m, k is a discrete frequency index with $0 \leq k \leq N-1$, and $w_a$ is a window function. The normalized angular frequency $\Omega_k$ is given by $\Omega_k = 2\pi k/N$. The DFT has size N and $R_a$ is an analysis hop size.

The indices for time and frequency are omitted in the description when possible for brevity.

The output time-domain signal y(n) is computed from output spectral coefficients Y(m, k) in the synthesis stage by means of the inverse of the STFT which is performed in two steps:

Firstly, an inverse Discrete Fourier transform is computed for each of the M frames according to $$y_m(n) = \frac{1}{N}\sum_{k=0}^{N-1} Y(m, k)e^{j\Omega_k n} \qquad (2)$$

Secondly, an overlap-add procedure is applied according to $$y(n) = \sum_{m=0}^{M} w_s(n - mR_s)y_m(n - mR_s) \qquad (3)$$

with optional synthesis window $w_s(n)$ and synthesis hop size $R_s$.

A time scale modification is achieved by setting the synthesis hop size $R_s$ and the analysis hop size $R_a$ to different values: the signal is stretched in time if $R_a < R_s$ and is shrinked if $R_a > R_s$.

The analysis window $w_a$ and synthesis window $w_s$ are chosen such that if $R_a = R_s$ and Y(m, k)=X(m, k), then the input and output signal are identical.

Short-time Fourier transform coefficients X(m, k) for real-valued input signals (which is the case for audio signals considered here) are complex-valued numbers that can be expressed in polar coordinates by their magnitude |X| and phase $\Phi$, as $$X = |X|\exp(j\Phi_x), \qquad (4)$$

$$\Phi_x = \arcs X, \qquad (5)$$

where $j = \sqrt{-1}$.

If the two hop sizes $R_a$ and $R_s$ differ, i.e. if $R_a \neq R_s$, then the phases of Y(m, k) need to be modified such that "horizontal phase coherence" is achieved. This means that for a sinusoid of constant frequency, successive frames overlap coherently without discontinuities or phase cancellation (destructive interference).

The phase vocoder approach is appropriate for polyphonic inputs, e.g. musical recordings. Its drawback is that the modification of the phase can produce an artefact known as "transient smearing", i.e. the temporal envelope of the signal is modified such that note onsets are perceived as having less attack and sound less percussive. Additional processing can be applied to the output phase to mitigate the transient smearing, e.g. by applying a method called "phase locking" [2] or by resetting the phase during periods of silence [3].

Following a suitable procedure of modifying the phase, an output is obtained. The spectral coefficients of the output can be written with polar coordinates as Y=|Y| exp(j$\Phi_y$) where $\Phi_y$ denotes the modified phase. The process of computing the phase $\Phi_y$ is in the following referred to as phase adaptation (PA).

Various ways to process two-channel audio input signals are known.

One option is to downmix the multi-channel signal to a single-channel signal, i.e. adding scaled versions of all channels, and to process the single-channel (mono) signal. Processing a mono mixdown of the input signal has the disadvantage that the stereophonic information is lost and thereby the sound quality is reduced.

A different option is to process the separated input channel signals independently. The main disadvantage of separately processing each channel signal is that arbitrary decorrelation between the channels is introduced which distorts the stereo image. Because the phase adaptation of time scale modification is a signal dependent processing, the relations between the phases of the individual channels are not preserved when the corresponding channel signals are different. The distortions of the spatial information can be perceived as blurring or widening of the stereo image of direct sound sources (singers or soloist, for example).

SUMMARY

According to an embodiment, an apparatus for processing a multichannel audio signal having a plurality of channel signals is configured for performing a time scale modulation of the multichannel audio signal and may have; a combiner for providing combined signals based on the channel signals, wherein the combiner is configured for providing a sum signal by calculating a sum of two channel signals and for providing a difference signal by calculating a difference of two channel signals; a phase adaptor, wherein the phase adaptor is configured for providing at least one processed signal by modifying a phase of the sum signal, and possibly a processed difference signal by modifying a phase of the difference signal, wherein the phase adaptor is configured for modifying the phase by applying a phase vocoder method, wherein the phase adaptor is configured for modifying the phase by applying a phase locking, or wherein the phase adaptor is configured for modifying the phase so that a horizontal phase coherence is maintained, and a separator, wherein the separator is configured for providing separated signals based on the at least one processed signal and the difference signal or the processed difference signal, wherein the separator is configured for reversing the combination of the channel signals, applied by the combiner.

According to another embodiment, a method for processing a multichannel audio signal having a plurality of channel signals is configured for performing a time scale modification of the multichannel audio signal and may have the steps of: providing combined signals based on the channel signals, wherein the combined signals have a sum signal calculated from a sum of two channel signals and a difference signal calculated from a difference of two channel signals, providing at least one processed signal by modifying a phase of the sum signal, and possibly a processed difference signal by modifying a phase of the difference signal, wherein the providing the processed signal includes modifying the phase by applying a phase vocoder method, or modifying the phase by applying a phase locking, or modifying the phase so that a horizontal phase coherence is maintained, and providing separated signals based on the at least one processed signal and the difference signal or the processed difference signal, wherein providing the separated signals includes reversing the combination of the channel signals, applied by the providing the combined signals.

According to another embodiment, a non-transitory digital storage medium may have a computer program stored thereon to perform the inventive method, when said computer program is run by a computer.

What is provided is an apparatus for processing a multichannel audio signal. The multichannel audio signal is comprising a plurality of or at least two channel signals. The apparatus is configured for performing a time scale modulation of the multichannel audio signal, i.e. the multichannel audio signal is slowed down or sped up without affecting its pitch. The apparatus comprises a phase adaptor and a separator. The phase adaptor is configured for providing at least one processed signal by modifying a phase of a signal based on a combination of the channel signals. The separator is configured for providing separated signals based on the at least one processed signal.

The invention improves processing signals and especially audio or speech signals. Especially addressed is the problem of processing stereophonic input signals having two or more channels.

An advantage of the invention is that the spatial characteristics of the input audio signal are preserved such that the perceived stereo image is not distorted. In particular, the positions of the sound sources and the diffuseness are not changed due to the TSM processing.

The invention thus addresses the problem that the spatial characteristics of the output signal are severely distorted in the state of art, which is most noticeable when listening to sound sources panned to the center of the stereo image.

The apparatus performs the time scale modification of the multichannel audio signal by performing a phase adaptation. In the state of art, different procedures of modifying the phase (including phase locking and other means) are known.

One embodiment for modifying the phase comprises to modify the phase such that the phase propagation between adjacent frames with the synthesis hop size $R_s$ is identical to the phase propagation of the input signal for the analysis hop size $R_a$. This ensures that the horizontal phase coherence (i.e. the temporal evolution of the phases in each frequency bin) is maintained. This is achieved by computing the instantaneous frequency at time frame m given the input phase of the current and the preceding time frame and the analysis hop size $R_a$ and the STFT (Short Time Fourier Transform) parameters. The desired phase propagation is computed using the instantaneous frequency and the synthesis hop size $R_s$.

In an additional embodiment, the foregoing method is enhanced by a method comprising "phase locking". Phase locking aims to improve vertical phase coherence, i.e. to maintain the relation of the phase between adjacent frequency bins in each frame. This improves the sound quality as is for example noticeable when processing music signals containing transients or percussive notes.

The phase adaptor is configured to adapt the phase of at least one combination of the channel signals comprised by the multichannel audio signal. For this, the signals to be processed by the phase adaptor are given with polar coordinates by a magnitude and a phase.

The separator following the phase adaptor provides separated signals based on the processed signal, i.e. based on the signal with a modified phase. The separator reverses the combination of signals and extracts or generates separated signals.

Hence, the apparatus modifies the phase of at least one combination of channel signals and provides individual modified signals by separating the phase adapted combination of channel signals into separated signals.

The inventive phase adaptation is most suitable as an extension to time scale modification using the phase vocoder, i.e. processing in the frequency domain. However, it can also be applied as an extension to TSM in the time domain. To this end, the time-domain TSM is configured to process the at least one signal that is obtained by combining the channel signals comprised by the multichannel audio signal. The separator following the time-domain TSM provides separated signals based on the processed signal.

In an embodiment, the phase adaptor is configured for providing N processed signals by modifying phases of N signals based on combinations of N channel signals. The separator is configured for providing N separated signals based on the processed signals. N is a number of channel signals comprised by the multichannel audio signal and is a integer greater than or equal to two. In an embodiment, N is the number of all channel signals comprised by the multichannel audio signal. Hence, N channel signals are converted into N combined signals that are—after the phase adaptation—separated into N signals.

According to an embodiment, the N combinations of the channel signals are linear combinations of the channel signals. In an embodiment, the phase adaptor handles various combinations of channel signals, whereas the combinations are linear combinations, e.g. the sum or the difference of channel signals.

In an embodiment, N equals two (N=2) and the two combinations of the two channel signals are a sum and a difference signal. In a different embodiment, N is greater than two.

In a further embodiment, the apparatus comprises a transformer. The transformer is configured for providing transformed signals by transforming signals from the time domain into the frequency domain. The transformer allows to transform signals from the time into the frequency domain and, subsequently, to process these signals in the frequency domain. The signals to be transformed are in one embodiment the channel signals comprised by the multichannel audio signal.

According to an embodiment, the transformer is configured for providing transformed signals by applying a Short Time Fourier Transformation. The Short Time Fourier Transform or alternatively Short Term Fourier Transform (STFT), is a Fourier-related transform of local sections of a signal as it changes over time. In practice, a longer signal is divided into shorter segments of equal length and the Fourier transform is computed separately on each segment.

In a further embodiment, the apparatus comprises a combiner, wherein the combiner is configured for providing combined signals based on the channel signals. The transformer is configured for providing transformed signals based on the combined signals by applying a transformation. Here, the channel signals are combined and the combinations are transformed into the frequency domain.

In a different embodiment, the sequence of combiner and transformer is reversed. In this embodiment, the combiner comprised by the apparatus is configured for providing combined signals based on transformed signals provided by the transformer. In this embodiment, the combiner receives transformed signals from the transformer and combines them in order to provide combined signals. Thus, the channel signals are individually transformed into the frequency domain and are combined in this domain by the combiner.

In a further embodiment, the combiner is configured for providing a sum signal as a combined signal by calculating a sum of two transformed signals. In this embodiment, a linear combination of the channel signals via their transformed signals in the form of a summation is used to provide at least one combined signal. If the multichannel audio signal comprises, for example, two channel signals as stereo signals, then both channel signals are added to each other for obtaining one combined signal being a sum signal. In a different embodiment, the combiner calculates a sum of channel signals of at least two channel signals.

According to an embodiment, the combiner is configured for providing a difference signal as combined signal by calculating a difference between two transformed signals. In this embodiment, the linear combination of signals is a difference between two signals. The signals to be combined are here transformed signals. In a different embodiment, the combiner calculates a difference between two channel signals.

According to an embodiment, the combiner is configured for providing combined signals by applying a mixing matrix—called g—having dimensions N times N to a multichannel signal comprising the N transformed signals, according to $\tilde{X}=gX$.

N is a number of channel signals comprised by the multichannel audio signal $\tilde{X}$ and is the matrixed multichannel signal based on the transformed signals and represents, thus, the combined signals in a general form.

With other words: the combiner is configured for providing the combined signals by applying a mixing matrix having dimensions N times N to the N transformed signals—advantageously in a matrixed format—wherein the transformed signals are based on the N channel signals belonging to the multichannel audio signal.

As the mixing matrix has the same number of columns and rows, the number of signals to be combined equals the number of combined signals, as shown in the following equation:

$$\begin{bmatrix} \tilde{X}_1 \\ \tilde{X}_2 \\ \vdots \\ \tilde{X}_N \end{bmatrix} = \begin{bmatrix} g_{1,1} & g_{1,2} & \cdots & g_{1,N} \\ g_{2,1} & g_{2,2} & \cdots & g_{2,N} \\ \vdots & & & \\ g_{N,1} & g_{N,2} & \cdots & g_{N,N} \end{bmatrix} \cdot \begin{bmatrix} X_1 \\ X_2 \\ \vdots \\ X_N \end{bmatrix}$$

Applying the mixing matrix is equivalent to computing the k-th channel signal of the combined signal by summing all channel signals of the multichannel audio signal multiplied by the corresponding elements of the k-th row of the matrix, as shown in the following equation:

$$\tilde{X}_k = gk_{,1}X_1 + gk_{,2}X_2 + \ldots gk_{,N}X_N$$

In a different embodiment, the defined mixing matrix is applied to a signal based on the N channel signals. The mixing matrix allows to combine any given number of signals, being either transformed or channel signals.

In a further embodiment, the phase adaptor is configured for modifying the phases by applying a phase vocoder method. A phase vocoder is a vocoder scaling both the frequency and time domains of audio signals by using phase information.

According to an embodiment, the phase adaptor is configured for providing processed signals by their polar coordinates having amplitudes and modified phases. Thus, in one embodiment with N=2 channel signals $Y_s$, $Y_d$, the processed signals are given by: $Y_{s/d}=|Y_{s/d}| \exp(\Phi_{s/d})$ with $\Phi_{s/d}=\arg Y_{s/d}$ and $j=\sqrt{-1}$.

The separator provides single signals based on the processed signals that are based on the combined signals. The signals provided by the separator are to be used as time scale modified channel signals. Hence, according to an embodiment if the multichannel audio signals comprises N channel signals, then the separator provides N separated signals.

According to an embodiment, the separator is configured for providing a separated signal based on a difference between two of the processed signals.

In a further embodiment, the separator is configured for providing a separated signal based on a sum of two of the processed signals.

In an embodiment, the separator applies a factor—for example 0.5—to the amplitude of the respective combination of the processed signals.

According to an embodiment, the separator is configured for providing N separated signals by applying an inverse mixing matrix having dimensions N times N to a matrixed signal based on the N processed signals. N is a number of channel signals comprised by the multichannel audio signal. This embodiment allows to process any given number of processed signals and to provide the corresponding number of separated signals. The inverse mixing matrix is the inverse of the mixing matrix used for obtaining the combined signals.

According to an embodiment, the apparatus comprises a corrector, wherein the corrector is configured to modify the separated signals by replacing amplitudes of the separated signals with amplitudes based on amplitudes of the channel signals comprised by the multichannel audio signal.

This embodiment comprises to process a linear combination of the channel signals and to apply a magnitude correction procedure after the signals have been modified in the frequency domain.

The novelty of the presented method is, thus, in this embodiment two-fold:

1) to apply the TSM processing to the advantageously linear combinations, aq. to the sum signal and the difference signal and 2) to apply a processing for restoring the magnitude of the output signal in the time-frequency domain in order to restore the inter-channel level differences (ICLD).

In a further embodiment, the corrector is configured to replace the amplitudes of the separated signals with amplitudes of the corresponding transformed signals provided by a transformer, i.e. by the amplitudes of the channel signals in the frequency domain.

The corrector, thus, replaces the amplitudes of the separated signals having the adapted phase by the amplitudes of the corresponding signals before the adaptation. Hence, the original amplitudes are restored.

The following embodiments take care of signals in the frequency domain and allow to process them in the time domain.

In an embodiment, the apparatus comprises an inverse transformer. The inverse transformer is configured for providing modified channel signals based on the separated signals by applying an inverse transformation. This inverse transformation transforms in an embodiment signals from the frequency into the time domain.

According to another embodiment, the apparatus comprises an inverse transformer. The inverse transformer is configured for providing modified and corrected channel signals based on corrected signals provided by the corrector by applying an inverse transformation, According to a different embodiment, the inverse transformer is configured for applying an inverse Short Time Fourier Transformation.

The inverse transformer is, thus, configured to reverse the kind of transformation performed in a step preceding the phase adaptation.

According to an embodiment, the apparatus comprises an extractor, wherein the extractor is configured for providing channel signals comprised by the multichannel audio signal. In this embodiment, the apparatus e.g. receives the multichannel audio signal and the extractor provides the individual channel signals. In a different embodiment, the channel signals are separately submitted to the apparatus.

The following embodiment allows to facilitate the computational steps and the requirements for the units.

According to an embodiment, the apparatus is configured to perform steps on combinations of channel signals based on a difference with less precision than on different combinations of the channel signals.

The method comprises at least the following steps:
providing at least one combined signal based on channel signals comprised by the multichannel audio signal,
providing a processed signal by performing a time scale modulation of e combined signal, and
providing modified channel signals based on a separation of the processed signals.

The time scale modulation is in one embodiment performed by a phase adaptation.

According to an embodiment, the method further comprises modifying amplitudes of modified channel signals by replacing the amplitudes with amplitudes based on amplitudes of the corresponding channel signals.

In this embodiment, the following steps happen: The channel signals are combined into combined signals. The combined signals or signals based on the combined signals undergo a phase adaptation in order to perform the time scale modification. The phase adapted signals are separated in separate signals. The signals comprise phases and amplitudes. The amplitudes/magnitudes of these signal are replaced by amplitudes based on the channel signals.

The embodiments of the apparatus can also be performed by steps of the method and corresponding embodiments of the method. Therefore, the explanations given for the embodiments of the apparatus also hold for the method.

BRIEF DESCRIPTION OF THE DRAWINGS

Embodiments of the present invention will be detailed subsequently referring to the appended drawings, in which.

DETAILED DESCRIPTION OF THE INVENTION

Figure 2:
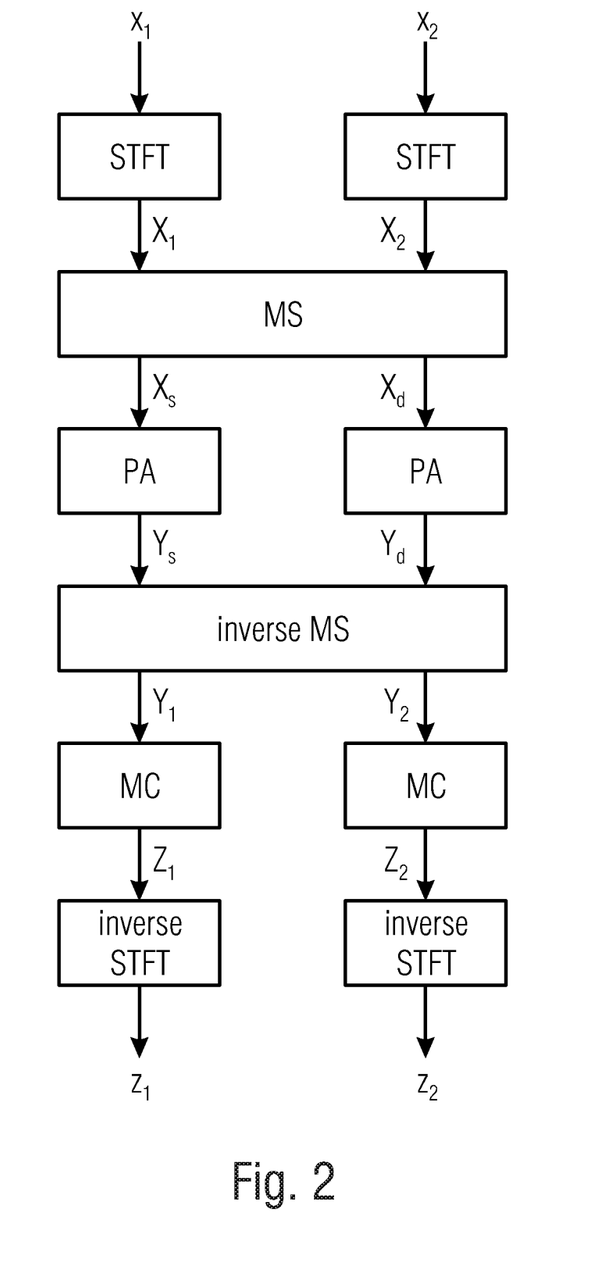
FIG. 2 illustrates a block diagram of the inventive time scale modification method for input audio signals with two channels, FIG. 3 provides schematically an embodiment of the apparatus, FIG. 4 provides a different embodiment of the apparatus

A block diagram of an embodiment of the inventive method is depicted in FIG. 2 for the example of input signals having two channels (e.g. the left and right channel of stereo sound).

The input audio signal is $x=[x_1\ x_2]^1$, where $x_1$ denotes the first channel signal and $x_2$ denotes the second channel signal. A short-time Fourier transform (STFT) representation is computed for $x_1$ and $x_2$, yielding $X_1$ and $X_2$, respectively, in the step STFT.

According to the invention, a sum signal $X_s$ and a difference signal $X_d$ are computed in the step named MS from the channel signals—here: the transformed channel signals $X_1$ and $X_2$—of the multichannel audio signal according to $$(X_s = (X_1 + X_2),\tag{6}$$

$$X_d = (X_1 - X_2).\tag{7}$$

In a different embodiment, the order of STFT and the combination of the signals in step MS are switched. This takes into consideration, that computing the sum and difference signals can also be performed in the time domain and that the STFT can be computed from the time domain sum and difference signals. It is however advantageous to apply the order as shown in FIG. 2 to reduce the computational load.

The sum signal X and the difference signal $X_d$ are then processed by means of a phase adaptation (PA) method, e.g. by using the phase vocoder method described in [2], or any other time scale modification method. The processed sum signal and difference signal are denoted by $Y_s$ and $Y_d$, respectively.

This is followed by an inverse transformation in step inverseMS, e.g. by transforming the signals $Y_s$ and $Y_d$ by an inverse short-time Fourier transform.

The processed signals for the first and the second channel are obtained in the shown embodiment by applying the following Equations (8) and (9), i.e. the inverse processing of Equations (6) and (7).

Hence, the two separated signals $Y_1$ and $Y_2$ are given in the shown embodiment by:

$$Y_1 = 0.5(Y_s + Y_d),\tag{8}$$

$$Y_2 = 0.5(Y_s - Y_d).\tag{9}$$

In a general form, the computation of the sum signal and the difference signal (as examples of the combined signals) are expressed in matrix notation as $$\tilde{X} = gX \tag{10}$$

with STFT coefficients of the input signal $X=[X_1 \ldots X_N]^T$, a number of channels N, STFT coefficients of the matrixed signal $\tilde{X}=[\tilde{X}_1 \ldots \tilde{X}_N]^T$, and a mixing matrix g of size N times N.

For example, the sum signal X, and the difference signal $X_d$—as given by Equations (6) and (7)—are obtained for N=2 by setting $$g = \begin{pmatrix} 1 & 1 \\ 1 & -1 \end{pmatrix} \text{ and } \tilde{X} = [X_s X_d]^T.$$

The inverse processing of the matrix operation, i.e. computing the channel signals $Y=[Y_1 \ldots Y_N]^T$ from the matrixed signal $\tilde{Y}=[\tilde{Y}_1 \ldots \tilde{Y}_N]^T$ is obtained from $$Y = g^{-1}\tilde{Y} \tag{11}$$

where $\tilde{Y}$ is the result of the PA processing applied to $\tilde{X}$ and $g^{-1}$ is the inverse of matrix g. With this generalization, the proposed method can also be applied to signals having more than two channels.

A very advantageous step of the shown embodiment is to correct the magnitude of the spectral coefficients such that the resulting complex-valued spectral coefficients have the phase of the result of the separation step using Equations (8) and (9) and the magnitude of $X_1$ and $X_2$ of the transformed channel signals.

The separated signals are given in polar coordinates as:

$$Y_{1/2} = |Y_{1/2}|\exp(j\Phi_{y,1/2}) \text{ with } \Phi_{y,1/2} = \arg Y_{1/2} \text{ and } j = \sqrt{-1}.$$

Hence, for the shown two-channel input signals, the corrected signals $Z_1$ and $Z_2$ following the step MC are given by:

$$Z_1 = |X_1|\exp(j\Phi_{y,1}),\tag{12}$$

$$Z_2 = |X_2|\exp(j\Phi_{y,2}).\tag{13}$$

This step ensures that the inter-channel level differences (ICLD) of the audio signal is preserved.

Hence, in this step the magnitudes of the processed signals are substituted by the original amplitudes of the transformed channel signals.

For the general case of input signals having more than two channels, each output signal after the inverse matrix operation—i.e. after the separation in separated signals following the individual phase adaptation—is modified in an embodiment such that its magnitude is replaced by the magnitude of the corresponding—advantageously transformed—channel signal (before matricing, i.e. before computing the combinations of different channel signals), The PA processing has a considerable computational complexity. It involves various processing steps that can be implemented with reduced precision in order to reduce the computational load.

For example, the computation of the polar coordinates (magnitude and phase) of a complex number given by its Cartesian coordinates (real and imaginary component) can be implemented with lower or higher precision. Often, computations at lower precision have lower computational costs but introduce an error.

The computational load can be reduced by taking advantage of the fact that for typical audio signals (e.g. musical recordings or broadcast signals) the sum signal has higher energy then the difference signal, Errors that result from approximations in the computation have a smaller effect when they are introduced in the difference signal and greater effect when they occur in the sum signal. This can be exploited by applying methods with smaller precision for computing the difference signal $Y_d$ and methods with larger precision when computing the sum signal $Y_s$.

Another means for reducing the computational load is to skip certain processing steps. For example, the phase locking can be skipped when computing the difference signal $Y_d$. Phase locking refers to an additional processing step for improving the sound quality. For reducing the computational load, the phases for the difference signal $Y_d$ are computed such that the phase propagation is maintained without applying the phase locking processing.

Another means for reducing the computational load is to apply the processing with high-quality (large precision including all processing steps like phase locking) only up to a maximum frequency value. For a digital signal sampled at 48 kHz, for example, the high quality processing is only applied to frequency bands up to a maximum value of 10 kHz.

The maximum frequency up to which the processing is applied with the best possible quality can be further reduced for the computation of the difference signal.

Figure 3:
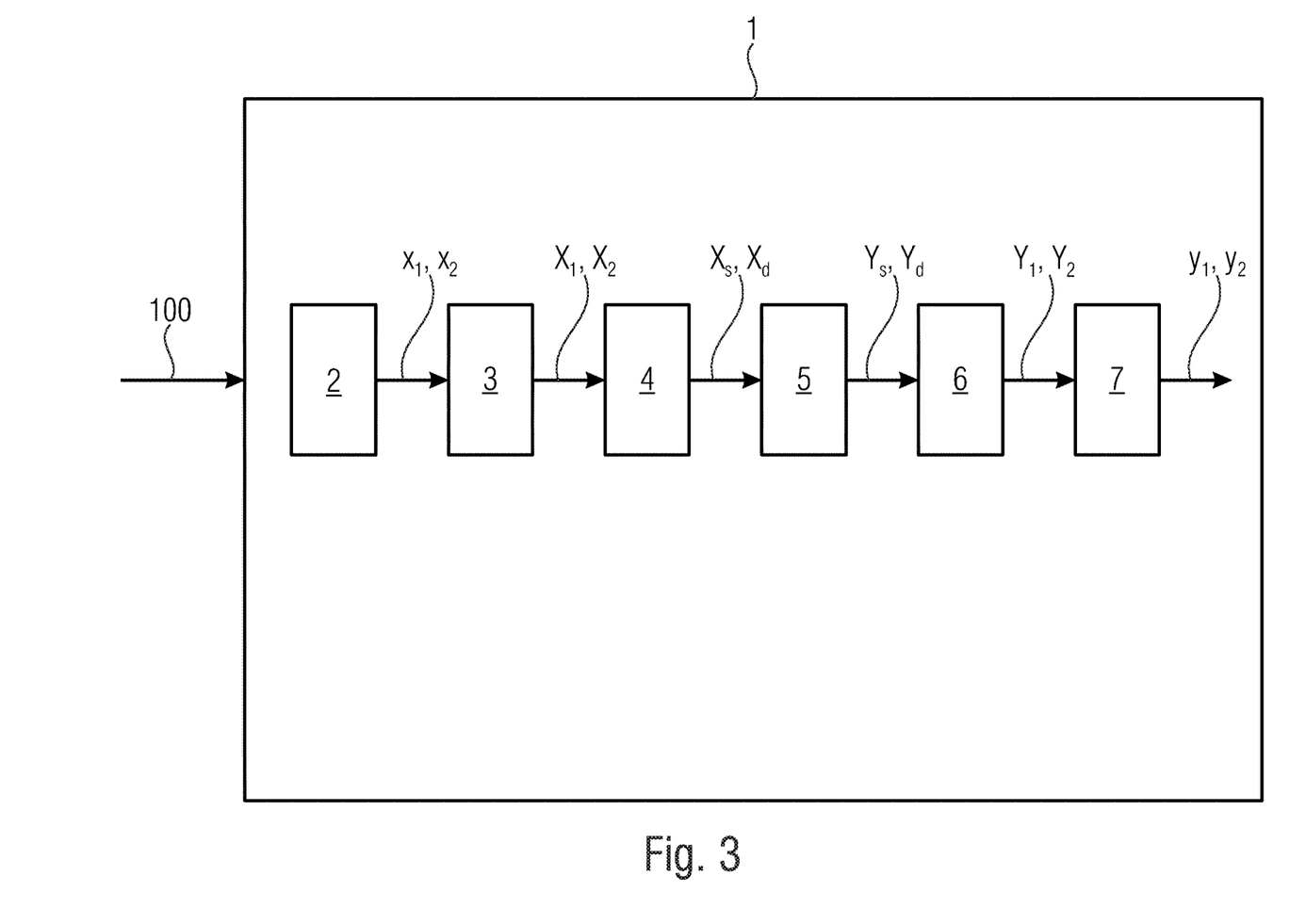

FIG. 3 shows an embodiment of the apparatus 1 which performs a time scale modification of a multichannel audio signal 100. The multichannel audio signal 100 may comprise more than two channel signals. The time-scale modification is achieved by a phase adaption.

An extractor 2 retrieves the channel signals $x_1$, $x_2$ comprised by the multichannel audio signal 100. In the shown embodiment, there are just two channel signals. Nevertheless, the invention is not limited to two channel signals.

In a different—and not shown—embodiment, the channel signals $x_1$, $x_2$ are separately provided to the apparatus 1. Hence, for such an embodiment no extractor is required.

The channel signals $x_1$, $x_2$ are signals in the time domain and are, in the shown embodiment, submitted to a transformer 3. The transformer 3 transforms the channel signals $x_1$, $x_2$ into the frequency domain and, thus, provides transformed signals $X_1$, $X_2$.

The transformed signals $X_1$, $X_2$ are submitted to a combiner 4. The combiner 4 combines the transformed signals $X_1$, $X_2$—n the given example—by applying linear combinations of them, e.g. by calculating a sum $X_s$ of the transformed signals and a difference $X_d$ between them. The number of combined signals is in one embodiment identical to the number of channel signals.

In a different—not shown—embodiment, the sequence of the transformer 3 and the combiner 4 is reversed. This implies that the combiner 4 combines the channel signals and the transformer 3 transforms the combined signals in this different and not shown embodiment.

In the depicted embodiment, the combined signals—being combined transformed channel signals—$X_s$ and $X_d$ are submitted to the phase adaptor 5.

The phase adaptor 5 modifies the phases of the combined signals $X_s$ and $X_d$ and provides processed signals $Y_s$ and $Y_d$. The processed signals $Y_s$ and $Y_d$ have adapted phases reflecting the appropriate time scale modification of the combined signals $X_s$ and $X_d$. Hence, the combined signals are either slowed down or sped up.

In order to obtain time scale modified channel signals, the processed signals $Y_s$ and $Y_d$ are separated by the separator 6 providing separated signals $Y_1$ and $Y_2$ that undergo an inverse transformation by an inverse transformer 7. The resulting modified channel signals $y_1$ and $y_2$ are time signals and have the desired time scale.

Figure 4:
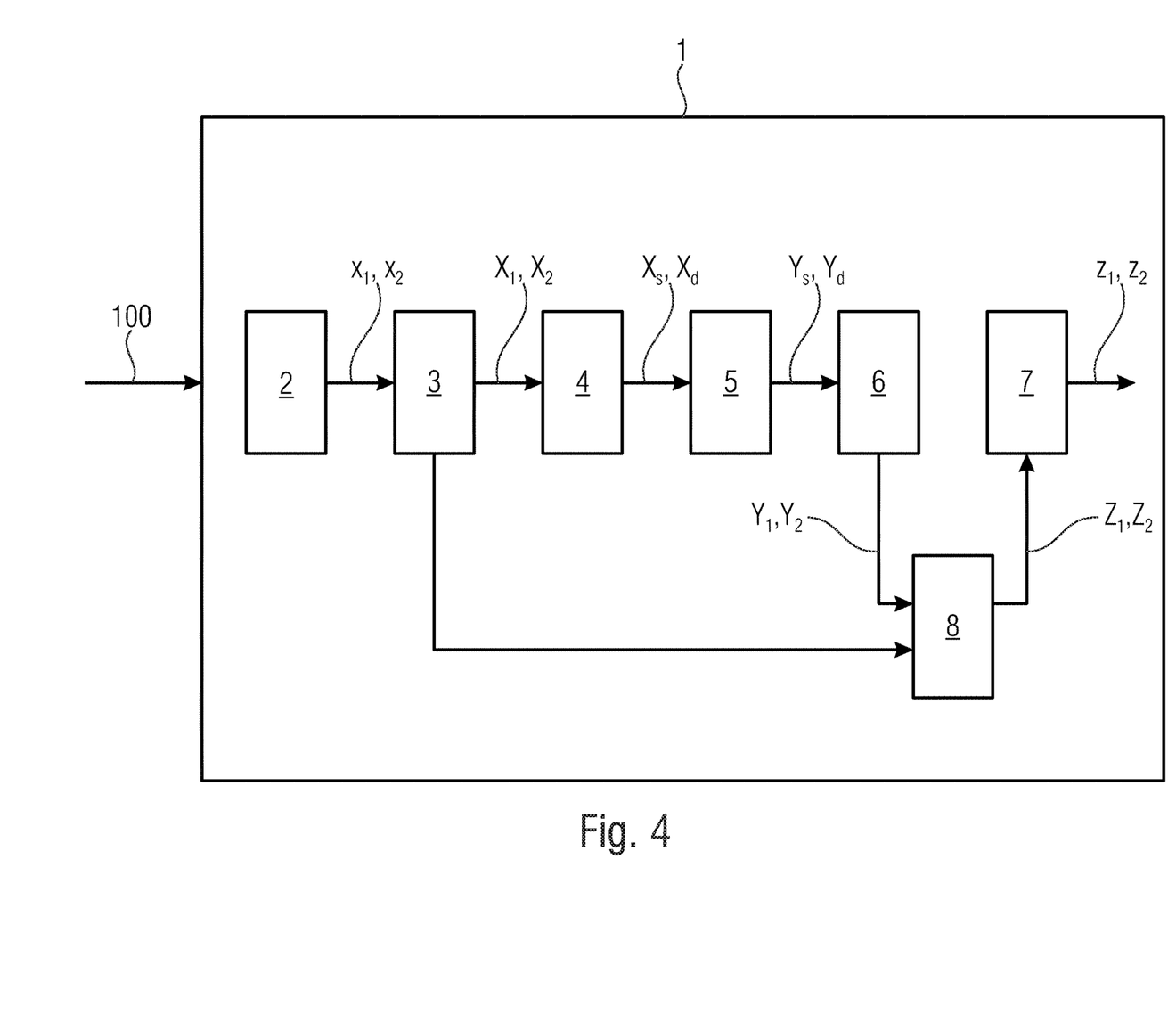

FIG. 4 shows a different embodiment of the apparatus 1.

The structure of the apparatus 1 shown in FIG. 4 is similar to the embodiment shown in FIG. 3. The difference between both embodiments is given by the units following the separator 6. For the explanation of the other elements see the description of FIG. 3.

The separator 6 in the embodiment shown in FIG. 4 also provides the separated signals $Y_1$ and $Y_2$. These frequency domain signals $Y_1$ and $Y_2$ are submitted in this embodiment to a corrector 8 that is upstream to the inverse transformer 7.

The corrector 8 replaces the amplitudes of the separated signals $Y_1$ and $Y_2$ by the amplitudes of the corresponding transformed signals $X_1$ and $X_2$, i.e. with the amplitudes or magnitudes before the phase adaptation and especially before the combination of the channel signals.

The resulting corrected or amplitude modified signals $Z_1$ and $Z_2$ (compare equations (12) and (13)) are submitted to the inverse transformer 7 and are transformed into the time domain as modified and corrected channel signals $z_1$, $z_2$.

In order to enable the correction, the transformer 3 is connected with the corrector 8.

In a further, not shown embodiment, the sequence of the transformer 3 and the combiner 4 are switched and the transformer 3, thus, transforms the combined signals. For the correction of the separated signals $Y_1$, $Y_2$ the corrector 8 refers therefore to additional transformations of the corresponding channel signals $x_1$, $x_2$.

Figure 5:
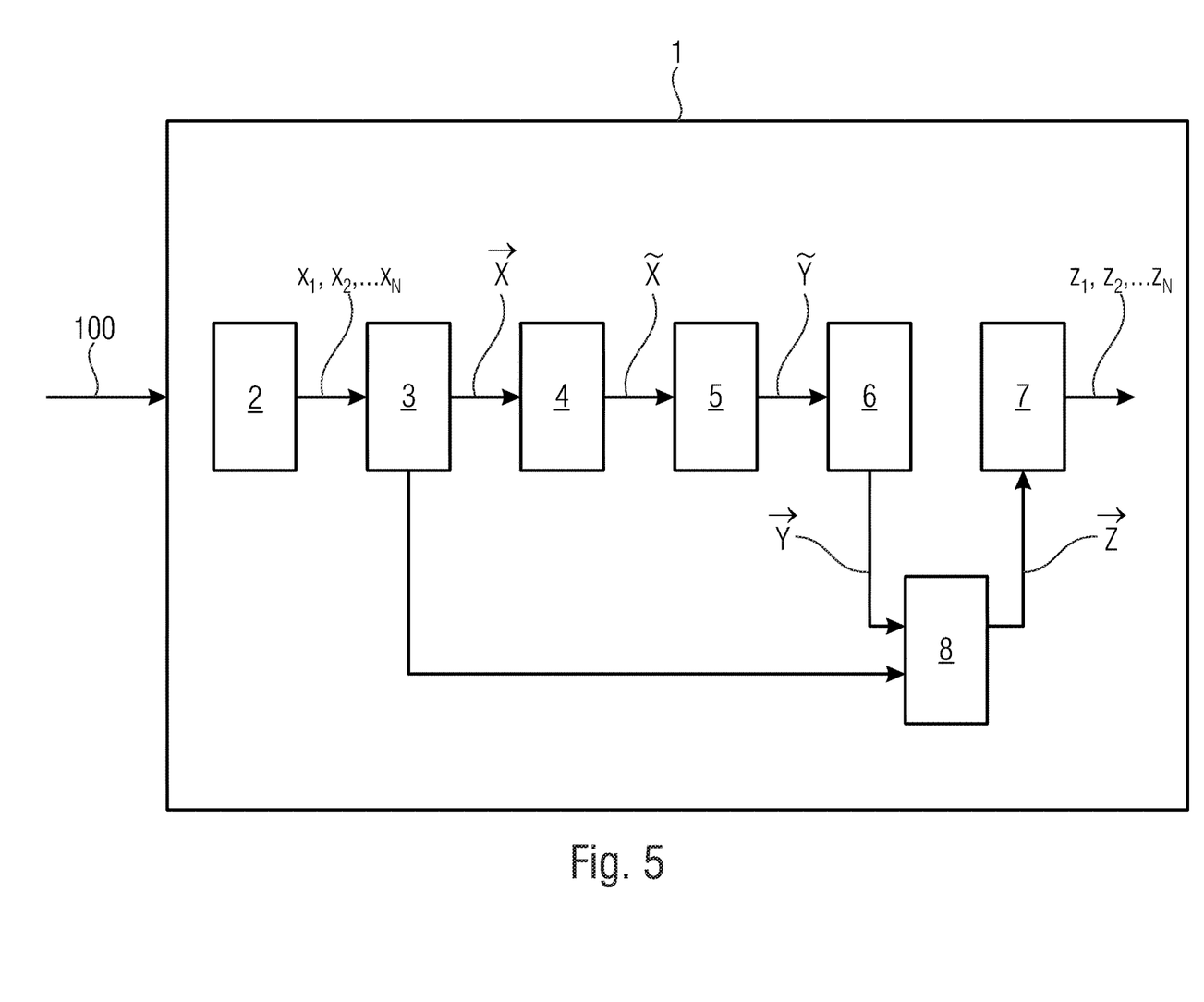
FIG. 5 illustrates a general version of the embodiment of FIG. 4.

The embodiment of FIG. 5 is a generalized version of the one shown in FIG. 4.

Here, the multichannel audio signal 100 comprises N channel signals $x_1, x_2, \ldots x_N$ where N is a integer greater than two.

The channel signals $x_1, x_2, \ldots x_N$ being time signals retrieved by the extractor 2 are submitted to the transformer 3 providing the transformed signals in the frequency domain $X_1, X_2, \ldots X_N$ which are here given by a vector $\vec{X}$ (alternatively given by X).

The following combiner 4 provides a vector of linear combinations $\tilde{X}=[\tilde{X}_1 \ldots \tilde{X}_N]^T$ by applying equation (10).

It follows the phase adaptor 5 providing processed signals (here given by a vector: $\vec{Y}$) that are separated by the separator 6. The separated signals $Y_1, Y_2, \ldots Y_N$ (here given by a vector $\vec{Y}$) are corrected with regard to their amplitudes by the corrector 8. The corrected signals $Z_1, Z_2, \ldots Z_N$ (given here by a vector $\vec{Z}$) are submitted to the inverse transformer 7 yielding N modified and corrected channel signals $z_1, z_2, \ldots z_N$. The switch from upper case to lower case indicated the transformation from the frequency to the time domain.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

The inventive transmitted or encoded signal can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive method is, therefore, a data carrier (or a non-transitory storage medium such as a digital storage medium, or a computer-readable medium) comprising, recorded thereon, the computer program for performing one of the methods described herein. The data carrier, the digital storage medium or the recorded medium are typically tangible and/or non-transitory.

A further embodiment of the invention method is, therefore, a data stream or a sequence of signals representing the computer program for performing one of the methods described herein. The data stream or the sequence of signals may, for example, be configured to be transferred via a data communication connection, for example, via the internet.

A further embodiment composes a processing means, for example, a computer or a programmable logic device, configured to, or adapted to, perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] M. Dolson, "The Phase Vocoder: A Tutorial", Computer Music Journal, vol, 10, pp. 14-27, 1986.

[2] J. Laroche and M. Dolson, "Improved Phase Vocoder Time-Scale Modification of Audio", IEEE Transaction on Speech and Audio Processing, vol, 7, no. 3, pp. 323-332, 1999.

[3] T. Karrer, E. Lee, and J. Borchers, "PhaVoRIT: A Phase Vocoder for Real-Time Interactive Time-Stretching," in Proc. of ICMC, 2006.

The invention claimed is:

1. Apparatus for processing a multichannel audio signal comprising a plurality of channel signals, comprising:
a combiner configured for calculating a sum signal of two channel signals of the plurality of channel signals and configured for providing a difference signal by calculating a difference of the two channel signals of the plurality of channel signals, wherein the two channel signals of the plurality of channel signals are represented in a time domain as a corresponding sequence of time domain samples, and wherein the combiner is configured to calculate the difference signal by calculating the difference between the samples from the corresponding sequences of time domain samples from the two channel signal, or wherein the two channel signals of the plurality of channel signals are represented in a frequency domain as a corresponding sequence of frequency domain samples, and wherein the combiner is configured to calculate the difference signal by calculating the difference between the samples from the corresponding sequences of frequency domain samples from the two channel signals,
wherein a first channel signal of the two channel signals has a first amplitude or magnitude or magnitude and a first phase, and wherein a second channel signal of the two channel signals has a second amplitude or magnitude or magnitude and a second phase;
a phase adaptor configured for performing a time scale modification of the multichannel audio signal, the time scale modification comprising modifying a phase of the sum signal of the two channel signals of the plurality of channel signals to obtain at least one processed signal, wherein the phase adaptor is configured
for modifying the phase of the sum signal of the two channel signals of the plurality of channel signals by applying a phase vocoder method to the sum signal to obtain the at least one processed signal, or
for modifying the phase of the sum signal of the two channel signals of the plurality of channel signals by applying a phase locking to the sum signal to obtain the at least one processed signal, or
for modifying the phase of the sum signal of the two channel signals of the plurality of channel signals to obtain the at least one processed signal, in which a horizontal phase coherence is maintained, and
a separator configured for providing two separated signals based on the at least one processed signal and the difference signal or a processed difference signal, wherein the separator is configured for reversing a combination of the channel signals of the plurality of channel signals, applied by the combiner, wherein a first separated signal of the two separated signals has a first separated amplitude or magnitude and a first separated phase, and wherein a second separated signal of the two separated signals has a second separated amplitude or magnitude and a second separated phase; and a corrector configured to modify the first separated signal by replacing the first separated amplitude or magnitude by the first amplitude or magnitude to obtain a corrected first separated signal, so that the corrected first separated signal comprises the first amplitude or magnitude and the first separated phase, and to modify the second separated signal by replacing the second separated amplitude or magnitude by the second amplitude or magnitude to obtain a corrected second separated signal, so that the corrected second separated signal comprises the second amplitude or magnitude and the second separated phase, wherein the corrected first separated signal and the corrected second separated signal-represent a time scale modified version of the multichannel audio signal.

2. The apparatus of claim 1, wherein the phase adaptor is configured for providing N processed signals by modifying phases of N signals based on combinations of N channel signals of the plurality of channel signals,
wherein the separator is configured for providing N separated signals based on the processed signal, and
wherein N is an integer number of the channel signals of the plurality of channel signals comprised by the multichannel audio signal.

3. The apparatus of claim 2, wherein the combinations of the N channel signals of the plurality of channel signals are linear combinations of the N channel signals of the plurality of channel signals.

4. The apparatus of claim 2, wherein the separator is configured for providing a separated signal based on a difference between two of the processed signals.

5. The apparatus of claim 2, wherein the separator is configured for providing a separated signal based on a sum of two of the processed signals.

6. The apparatus of claim 2, wherein the separator is configured for providing N separated signals by applying an inverse mixing matrix comprising dimensions N times N to a matrixed signal based on the N processed signals.

7. The apparatus of claim 1, wherein the apparatus comprises a transformer, and
wherein the transformer is configured for providing transformed signals by transforming signals from the time domain into the frequency domain.

8. The apparatus of claim 7, wherein the transformer is configured for applying a Short Time Fourier Transformation.

9. The apparatus of claim 7,
wherein the combiner is configured for providing the sum signal and the difference signal based on the channel signals of the plurality of channel signals, and
wherein the transformer is configured for providing transformed signals by applying a transformation to the sum signal and the difference signal.

10. The apparatus of claim 7,
wherein the combiner is configured for providing the sum signal and the difference signal based on transformed signals provided by the transformer.

11. The apparatus of claim 10, wherein the combiner is configured for providing a sum signal by calculating a sum of two transformed signals.

12. The apparatus of claim 10, wherein the combiner is configured for providing the difference signal by calculating a difference between two transformed signals.

13. The apparatus of claim 10, wherein the combiner is configured for providing the sum signal and the difference signal by applying a mixing matrix comprising dimensions N times N to the N transformed signals based on the N channel signals of the plurality of channel signals belonging to the multichannel audio signal, and
wherein N is an integer number of channel signals of the plurality of channel signals comprised by the multichannel audio signal.

14. The apparatus of claim 7, wherein the transformer exhibits an analysis hop size $R_a$,
wherein the apparatus further comprises an inverse transformer, wherein the inverse transformer exhibits a synthesis hop size $R_s$, and
wherein the synthesis hop size $R_s$ and the analysis hop size $R_a$ are set to different values, so that the time scale modification is a signal stretching in time, when $R_a<R_s$, or so that the time scale modification and is a signal shrinking in time, when $R_a>R_s$.

15. The apparatus of claim 1, wherein the
combiner is configured to perform an MS operation to provide a mid signal being the sum signal and a side signal being the difference signal.

16. The apparatus of claim 1, wherein the corrector is configured to replace the first and second separated amplitudes or magnitudes of the first and second separated signals by the first and second amplitudes or magnitudes, wherein the first and second amplitudes or magnitudes are amplitudes or magnitudes of transformed signals provided by a transformer, wherein the first channel signal and the second channel signal are the transformed signals, and wherein the transformer is configured for transforming a first time domain channel signal into a frequency domain to obtain the first channel signal and for transforming a second time domain channel signal into the frequency domain to obtain the second channel signal.

17. The apparatus of claim 1, wherein the
separator is configured to perform an inverse MS operation using, as an input, the at least one processed signal as a mid signal and the difference signal or a processed difference signal as a side signal.

18. The apparatus of claim 1, wherein the apparatus comprises an inverse transformer, and
wherein the inverse transformer is configured for inverse transforming the corrected first separated signal and the corrected second separated signal to provide an inverse transformed corrected first separated signal and an inverse transformed corrected second separated signal in a time domain.

19. The apparatus of claim 18, wherein the inverse transformer is configured for applying an inverse Short Time Fourier Transformation.

20. The apparatus of claim 1, wherein the apparatus comprises an extractor, and
wherein the extractor is configured for providing the first and second channel signals of the plurality of channel signals comprised by the multichannel audio signal.

21. The apparatus of claim 1, wherein the apparatus is configured to perform steps on combinations of channel signals of the plurality of channel signals based on a difference between signals with less precision than on different combinations of signals.

22. The apparatus of claim 1, wherein the phase adaptor is configured for providing the processed difference signal by modifying a phase of the difference signal, and wherein the separator is configured for providing the two separated signals based on the processed difference signal.

23. The apparatus of claim 1, wherein the combiner is configured to calculate the sum signal by adding samples from the corresponding sequences of time domain samples from the two channel signals.

24. The apparatus of claim 1, wherein the combiner is configured to calculate the sum signal by adding samples from the corresponding sequences of frequency domain samples from the two channel signals.

25. Method for processing a multichannel audio signal comprising a plurality of channel signals, comprising:
calculating a sum signal from a sum of the two channel signals of the plurality of channel signals and calculating a difference signal calculated from a difference of the two channel signals of the plurality of channel signals, wherein the two channel signals of the plurality of channel signals are represented in a time domain as a corresponding sequence of time domain samples, and wherein the combining comprises calculating the difference signal by calculating the difference between the samples from the corresponding sequences of time domain samples from the two channel signal, or wherein the two channel signals of the plurality of channel signals are represented in a frequency domain as a corresponding sequence of frequency domain samples, and wherein the combining comprises calculating the difference signal by calculating the difference between the samples from the corresponding sequences of frequency domain samples from the two channel signals,
wherein a first channel signal of the two channel signals has a first amplitude or magnitude and a first phase, and wherein a second channel signal of the two channel signals has a second amplitude or magnitude and a second phase;
performing a time scale modification of the multichannel audio signal, the time scale modification comprising modifying a phase of the sum signal of the two channel signals of the plurality of channel signals to obtain at least one processed signal,
by applying a phase vocoder method to the sum signal of the two channel signals of the plurality of channel signals to obtain the at least one processed signal, or
by applying a phase locking to the sum signal of the two channel signals of the plurality of channel signals to obtain the at least one processed signal, or
by obtaining the at least one processed signal, in which a horizontal phase coherence is maintained, and
providing two separated signals based on the at least one processed signal and the difference signal or a processed difference signal, wherein the providing the separated signals comprises reversing a combination of the channel signals of the plurality of channel signals, applied by the calculating the sum signal and the difference signal, wherein a first separated signal of the two separated signals has a first separated amplitude or magnitude and a first separated phase, and wherein a second separated signal of the two separated signals has a second separated amplitude or magnitude and a second separated phase; and
modifying the first separated signal by replacing the first separated amplitude or magnitude by the first amplitude or magnitude to obtain a corrected first separated signal, so that the corrected first separated signal comprises the first amplitude or magnitude and the first separated phase, and modifying the second separated signal by replacing the second separated amplitude or magnitude by the second amplitude or magnitude to obtain a corrected second separated signal, so that the corrected second separated signal comprises the second amplitude or magnitude and the second separated phase, wherein the corrected first separated signal and the corrected second separated signal represent a time scale modified version of the multichannel audio signal.

26. The method of claim 25, comprising providing the processed difference signal by modifying a phase of the difference signal, and
providing the two separated signals based on the processed difference signal.

27. A non-transitory digital storage medium having a computer program stored thereon to perform, when said computer program is run by a computer, the method for processing a multichannel audio signal comprising a plurality of channel signals, said method comprising:
calculating a sum signal of the two channel signals of the plurality of channel signals and calculating a difference signal from a difference of the two channel signals of the plurality of channel signals, wherein the two channel signals of the plurality of channel signals are represented in a time domain as a corresponding sequence of time domain samples, and wherein the combining comprises calculating the difference signal by calculating the difference between the samples from the corresponding sequences of time domain samples from the two channel signal, or wherein the two channel signals of the plurality of channel signals are represented in a frequency domain as a corresponding sequence of frequency domain samples, and wherein the combining comprises calculating the difference signal by calculating the difference between the samples from the corresponding sequences of frequency domain samples from the two channel signals
performing a time scale modification of the multichannel audio signal, the time scale modification comprising modifying a phase of the sum signal of the two channel signals of the plurality of channel signals to obtain at least one processed signal,
by applying a phase vocoder method to the sum signal of the two channel signals of the plurality of channel signals to obtain the at least one processed signal, or
by applying a phase locking to the sum signal of the two channel signals of the plurality of channel signals to obtain the at least one processed signal, or
by obtaining the at least one processed signal, in which a horizontal phase coherence is maintained, and
providing two separated signals based on the at least one processed signal and the difference signal or a processed difference signal, wherein providing the separated signals comprises reversing a combination of the channel signals of the plurality of channel signals, applied by the providing the sum signal and the difference signal, wherein a first separated signal of the two separated signals has a first separated amplitude or magnitude and a first separated phase, and wherein a second separated signal of the two separated signals has a second separated amplitude or magnitude and a second separated phase; and
modifying the first separated signal by replacing the first separated amplitude or magnitude by the first amplitude or magnitude to obtain a corrected first separated signal, so that the corrected first separated signal comprises the first amplitude or magnitude and the first separated phase, and modifying the second separated signal by replacing the second separated amplitude or magnitude by the second amplitude or magnitude to obtain a corrected second separated signal, so that the corrected second separated signal comprises the second amplitude or magnitude and the second separated phase, wherein the corrected first separated signal and the corrected second separated signal represent a time scale modified version of the multichannel audio signal.

28. Apparatus for processing a multichannel audio signal comprising a plurality of channel signals, comprising:
a combiner configured for calculating a sum signal of two channel signals of the plurality of channel signals and configured for providing a difference signal by calculating a difference of the two channel signals of the plurality of channel signals, wherein a first channel signal of the two channel signals has a first amplitude or magnitude and a first phase, and wherein a second channel signal of the two channel signals has a second amplitude or magnitude and a second phase;
a phase adaptor configured for performing a time scale modification of the multichannel audio signal, the time scale modification comprising modifying a phase of the sum signal of the two channel signals of the plurality of channel signals to obtain at least one processed signal, wherein the phase adaptor is configured
for modifying the phase of the sum signal of the two channel signals of the plurality of channel signals by applying a phase locking to the sum signal to obtain the at least one processed signal, or
for modifying the phase of the sum signal of the two channel signals of the plurality of channel signals to obtain the at least one processed signal, in which a horizontal phase coherence is maintained, and
a separator configured for providing two separated signals based on the at least one processed signal and the difference signal or a processed difference signal, wherein the separator is configured for reversing a combination of the channel signals of the plurality of channel signals, applied by the combiner, wherein a first separated signal of the two separated signals has a first separated amplitude or magnitude and a first separated phase, and wherein a second separated signal of the two separated signals has a second separated amplitude or magnitude and a second separated phase; and
a corrector configured to modify the first separated signal by replacing the first separated amplitude or magnitude by the first amplitude or magnitude to obtain a corrected first separated signal, so that the corrected first separated signal comprises the first amplitude or magnitude and the first separated phase, and to modify the second separated signal by replacing the second separated amplitude or magnitude by the second amplitude or magnitude to obtain a corrected second separated signal, so that the corrected second separated signal comprises the second amplitude or magnitude and the second separated phase, wherein the corrected first separated signal and the corrected second separated signal represent a time scale modified version of the multichannel audio signal.

29. Method for processing a multichannel audio signal comprising a plurality of channel signals, comprising:
calculating a sum signal from a sum of the two channel signals of the plurality of channel signals and calculating a difference signal calculated from a difference of the two channel signals of the plurality of channel signals, wherein a first channel signal of the two channel signals has a first amplitude or magnitude and a first phase, and wherein a second channel signal of the two channel signals has a second amplitude or magnitude and a second phase;
performing a time scale modification of the multichannel audio signal, the time scale modification comprising modifying a phase of the sum signal of the two channel signals of the plurality of channel signals to obtain at least one processed signal,
by applying a phase locking to the sum signal of the two channel signals of the plurality of channel signals to obtain the at least one processed signal, or
by obtaining the at least one processed signal, in which a horizontal phase coherence is maintained, and
providing two separated signals based on the at least one processed signal and the difference signal or a processed difference signal, wherein the providing the separated signals comprises reversing a combination of the channel signals of the plurality of channel signals, applied by the calculating the sum signal and the difference signal, wherein a first separated signal of the two separated signals has a first separated amplitude or magnitude and a first separated phase, and wherein a second separated signal of the two separated signals has a second separated amplitude or magnitude and a second separated phase; and
modifying the first separated signal by replacing the first separated amplitude or magnitude by the first amplitude or magnitude to obtain a corrected first separated signal, so that the corrected first separated signal comprises the first amplitude or magnitude and the first separated phase, and modifying the second separated signal by replacing the second separated amplitude or magnitude by the second amplitude or magnitude to obtain a corrected second separated signal, so that the corrected second separated signal comprises the second amplitude or magnitude and the second separated phase, wherein the corrected first separated signal and the corrected second separated signal represent a time scale modified version of the multichannel audio signal.

30. A non-transitory digital storage medium having a computer program stored thereon to perform, when said computer program is run by a computer, the method for processing a multichannel audio signal comprising a plurality of channel signals, said method comprising:
calculating a sum signal of the two channel signals of the plurality of channel signals and calculating a difference signal from a difference of the two channel signals of the plurality of channel signals, wherein a first channel signal of the two channel signals has a first amplitude or magnitude and a first phase, and wherein a second channel signal of the two channel signals has a second amplitude or magnitude and a second phase;
performing a time scale modification of the multichannel audio signal, the time scale modification comprising modifying a phase of the sum signal of the two channel signals of the plurality of channel signals to obtain at least one processed signal,
by applying a phase locking to the sum signal of the two channel signals of the plurality of channel signals to obtain the at least one processed signal, or by obtaining the at least one processed signal, in which a horizontal phase coherence is maintained, and providing two separated signals based on the at least one processed signal and the difference signal or a processed difference signal, wherein providing the separated signals comprises reversing a combination of the channel signals of the plurality of channel signals, applied by the providing the sum signal and the difference signal, wherein a first separated signal of the two separated signals has a first separated amplitude or magnitude and a first separated phase, and wherein a second separated signal of the two separated signals has a second separated amplitude or magnitude and a second separated phase; and modifying the first separated signal by replacing the first separated amplitude or magnitude by the first amplitude or magnitude to obtain a corrected first separated signal, so that the corrected first separated signal comprises the first amplitude or magnitude and the first separated phase, and modifying the second separated signal by replacing the second separated amplitude or magnitude by the second amplitude or magnitude to obtain a corrected second separated signal, so that the corrected second separated signal comprises the second amplitude or magnitude and the second separated phase, wherein the corrected first separated signal and the corrected second separated signal represent a time scale modified version of the multichannel audio signal.

* * * * *

UNITED STATES PATENT AND TRADEMARK OFFICE
CERTIFICATE OF CORRECTION

| | | |
|---|---|---|
| PATENT NO. | : 11,929,089 B2 | |
| APPLICATION NO. | : 16/176280 | |
| DATED | : March 12, 2024 | |
| INVENTOR(S) | : Christian Uhle et al. | |

It is certified that error appears in the above-identified patent and that said Letters Patent is hereby corrected as shown below:

In the Claims

In Claim 1, Column 15 Line 17, immediately following "signal", please delete "-"

Signed and Sealed this
Thirtieth Day of July, 2024

Katherine Kelly Vidal
*Director of the United States Patent and Trademark Office*